June 23, 1964 C. W. SKARSTROM 3,138,439
APPARATUS AND PROCESS FOR HEATLESS FRACTIONATION
OF GASEOUS CONSTITUENTS
Filed April 12, 1960
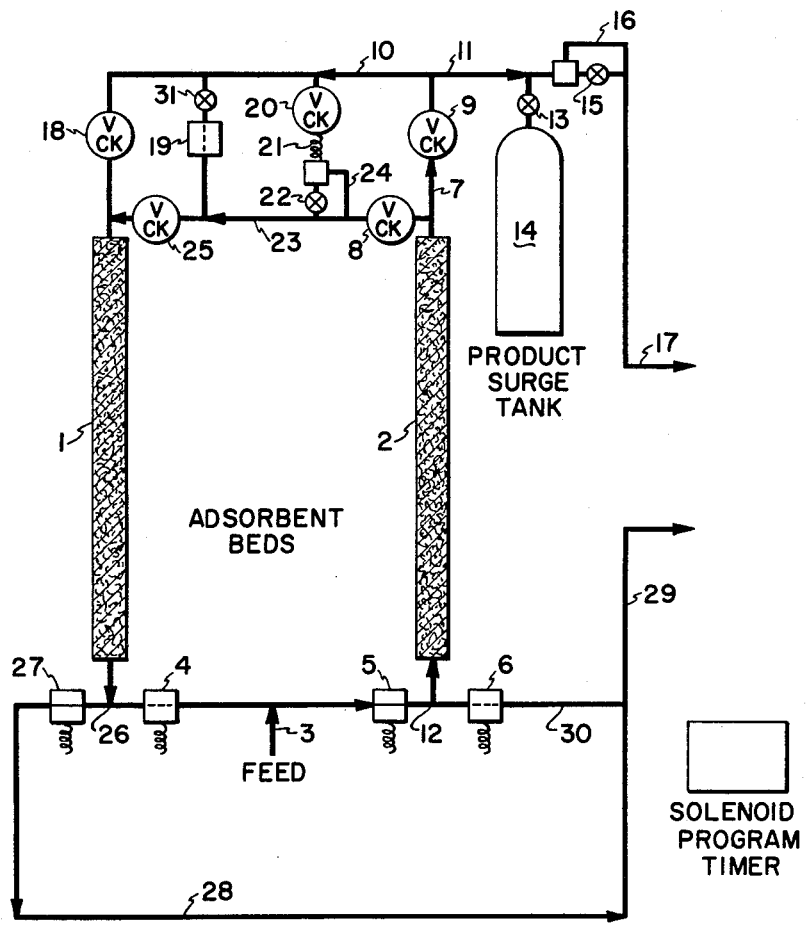
APPARATUS FOR HEATLESS
FRACTIONATION OF $H_2$ FROM $H_2$-$CH_4$ MIXTURES
Charles W. Skarstrom  Inventor
By W. O. Heilman
Patent Attorney

United States Patent Office 3,138,439
Patented June 23, 1964

3,138,439
APPARATUS AND PROCESS FOR HEATLESS FRACTIONATION OF GASEOUS CONSTITUENTS
Charles W. Skarstrom, Montvale, N.J., assignor to Esso Research and Engineering Company, a corporation of Delaware
Filed Apr. 12, 1960, Ser. No. 21,693
6 Claims. (Cl. 55—33)

The present invention is concerned with an improved method and an improved apparatus for fractionating gaseous mixtures. The invention comprises a continuation in part and an improvement of the process and apparatus described in copending application, Serial No. 714,780, filed February 12, 1958, entitled "Method and Apparatus for Fractionating Gaseous Mixtures," inventor Charles W. Skarstrom, now U.S. Patent 2,944,627.

The improved apparatus and process of the present invention comprises the utilization of interconnected solenoid valves or the equivalent whereby the low pressure zone is backwashed with product gas and brought up to the high pressure of the product gas. A spring loaded check valve is also utilized in the purge line so as to delay the purge flow until the spent bed has nearly reached its lowest pressure. The improved apparatus of the present invention also utilizes a product surge tank in a manner to markedly improve efficiency of operation.

The invention relates more particularly to a method and apparatus for removing one or more key components from a gaseous mixture or gas stream containing such components. The invention further relates to such a method and apparatus as employed for the separation from a gaseous mixture of one or more component contaminants. The invention also relates to a method and apparatus employed for the purpose of producing an effluent product wherein by removal of one or more components of the original mixture, the precentage concentration of more desirable components is increased in the resulting product. One specific adaptation of the invention relates to the drying of a gaseous mixture, such as air, by removal of water vapor. In addition, the invention relates to a method and apparatus whereby oxygen is removed from a stream of atmospheric air to increase the concentration of nitrogen in the effluent product stream. In this connection, the invention particularly relates to a combined system for separating air into its major components of oxygen and nitrogen, employing the fractionation method and apparatus herein disclosed. The invention is also concerned with the separation of various hydrocarbon gases one from the other, and for the removal of hydrogen, oxygenated compounds and the like from gaseous material containing the same.

In various industrial processes, moisture-free or oxygen- or nitrogen-rich air streams are essential to proper operating procedures. Many methods and a variation of apparatus combinations are known or have been proposed to obtain such ends. Most involve either complicated procedures or equipment expensive to assemble and operate. It is an object of the present invention to provide a simple method and apparatus which, with minor modification, may be employed in a multitude of situations where the purification or concentration of gaseous mixtures is desired. Specifically, the objects of the present invention may be stated as follows:

(1) To provide a separation system such as an adsorption system or diffusion system for the drying of air or other gaseous materials, without need for employment of extraneous heat to restore the absorbent used in the system.

(2) To provide such a system, wherein relatively small amounts of adsorbent material are required for efficient operation, and therefore, wherein expenditures for equipment are considerably reduced.

(3) To provide a method and apparatus whereby oxygen and/or nitrogen-rich products may be recovered from atmospheric air without liquefaction or other expensive or complicated procedures.

(4) To provide a method and apparatus whereby a gaseous mixture may be fractionated to provide a series of effluent product streams in which each such effluent stream is rich in at least one component portion of the gas mixture supplied to the system as a feed material.

The terms "gas" and "gaseous" as employed in the following description or claims are intended to include not only materials that are conventionally considered to be gases, but also those materials conventionally considered to be vapors. Also the term "key component" as employed in the following description or claims is used to designate the component or components selectively adsorbed from a stream of a gaseous material initially fed to the system.

The invention and its objects may be more fully understood from the following description when it is read in conjunction with, and with reference to the accompanying drawing. The drawing is a diagrammatic showing of an apparatus according to the present invention, illustrating flow connections and controls adapted to accomplish the method contemplated.

Referring to the drawing numerals 1 and 2 each designates one of a pair of adsorber vessels. Each vessel is adapted to contain and to be substantially fully packed with adsorbent material, to be later described in greater detail. Numeral 3 designates a feed line the flow of which is controlled by inlet valves 4 and 5. Thus as shown feed is introduced into zone 2 through open valve 5. Feed cannot flow through closed valve 4. Due to the fact that valve 6 is closed the feed flows upwardly through line 12 and into zone 2 and contacts adsorbent contained therein. Unadsorbed constituents are removed from the top of zone 2 through line 7. These upwardly flowing gaseous constituents cannot pass through check valve 8. These constituents, however, flow through check valve 9 and thence are distributed into lines 10 and 11. Adsorption zone 2 is at a predetermined elevated pressure. A portion of the gaseous constituents flowing through line 11 pass through valve 13 and into a product purge tank 14.

The remainder of the gaseous constituents pass through valve 15 the rate of flow of which is controlled by rate of flow controller 16 which maintains a predetermined pressure drop across valve 15. These product gaseous constitutents are removed by means of line 17 and handled as desired. The gaseous constituents flowing through line 10 cannot flow past check valve 18 or through valve 19 during the early part of the cycle. These gases from line 10 flow downwardly past check valve 20 which is spring loaded by means of spring 21 and through valve 22 into line 23.

The rate of flow of these constituents through valve 22 is controlled by rate of flow controller 24. The gaseous constituents flowing through line 23 pass through check valve 25 into low pressure zone 1 which is being desorbed. At this point the gaseous constituents cannot flow past valve 18 due to the high pressure existing in line 10. The gaseous constituents flow through zone 1 desorbing from the adsorbent previously adsorbed constituents. This backwash product from zone 1 together with desorbed constituents from zone 1 are removed by means of line 26. These constituents flow through valve 27, through line 28 and are withdrawn from the system by means of line 29. These constituents cannot flow through closed valve 4.

Valves 27, 4, 5, 19 and 6 are solenoid operated valves or equivalent and are controlled to operate in an interrelated manner as herein after described by solenoid program timer 30. Valves 9, 20, 18, 8, and 25 as shown are check valves or equivalent which permit flow of fluid in only one direction.

One specific method of operating as shown on the figure is as follows. The feed gas comprising hydrogen and hydrocarbon is introduced into zone 2 by means of line 3. This feed passes through an open solenoid operated valve 5 and is then introduced into the bottom of zone 2. Both zones 1 and 2 are packed with activated carbon. Substantially pure hydrogen is removed from the top of zone 2 by means of line 7. The hydrogen flows through check valve 9 and cannot pass through valve 8. The hydrogen then is divided. A portion of the same passes through line 11 while the remainder passes through line 10. A portion of the hydrogen passing through line 11 passes through valve 13 and is introduced into a product surge tank 14. The remainder of the hydrogen in line 11 passes through a rate of flow valve 15, the rate of which is adjusted by a flow controller 16 which maintains predetermined pressure differential across the valve. Product hydrogen is withdrawn by means of line 17.

That portion of the hydrogen removed by means of line 10 is passed through check valve 20, through rate of flow valve 22 and then into line 23. The rate of flow through valve 22 is maintained at the desired rate by flow controller 24 which maintains the desired pressure drop across valve 22. In addition, valve 20 is spring loaded by means of spring 21 so as to only open after predetermined pressure drop occurs across valve 20.

The hydrogen removed through line 23 passes through check valve 25 and into the top of zone 1 where it backwashes downwardly through the bed. Bed 1 is maintained at a predetermined pressure below the pressure existing in adsorption zone 2. The hydrogen together with adsorbed constituents is removed from the bottom of zone 1 through line 26. This stream passes through solenoid operated valve 27 through line 28 and is withdrawn from the system by means of line 29 and further processed or handled as desired. Thus, when zone 2 is on adsorption and zone 1 on desorption valves 5, 9, 13, 15, 20, and 22 are open, whereas valves 6, 8, 18 and 19 are closed. At the end of the cycle when valve 27 closes, valve 5 remains open until zone 1 reaches the predetermined high pressure. At this point valve 4 opens and valve 5 closes.

The cycle is then continued as hereinbefore described wherein zone 1 is on adsorption and zone 2 is on desorption. A portion of the product hydrogen flowing through valve 18 is used to backwash zone 2, a portion is used to repressure surge tank 14 and the remainder is passed through line 17 as product hydrogen. The hydrogen and desorbed components from zone 2 are passed through open valve 6, through line 30, and are withdrawn from the system through line 29.

In essence the two adsorbent beds are alternately connected to the high pressure feed. While one bed is at high pressure the other bed is dumped to the low pressure, backwashed with some of the high purity product $H_2$ through a flow control valve 22 and brought back up to line pressure with pure $H_2$ product. Five 2-way electric solenoid valves are used. These on-off valves are operated from a multicam recycling electric timer. The use of two on-off feed and two on-off dump valves allows the low pressure bed 1 to be repressured via valve 19 before the other bed is dumped. This insures continuity in the product pressure and flow.

Also in accordance with the present process by repressuring downward with the pure product gas has two desirable features. Inrushing gases from above tend to keep the spring loaded bed of particles well packed. This makes movement with consequent attrition of the particles negligible. Repressuring with pure product gas instead of feed eliminates the very fast inflow of feed. When repressuring with feed, the high space velocity of the incoming gas causes the fronts of the adsorbing components to be moved an excessive amount toward the product end. By recharging with product from the other bed which is at high pressure, the increased feed space velocity to provide this extra demand for $H_2$ is kept at a minimum. It is further minimized by a product surge tank.

To accomplish repressuring with the product, an on-off electric solenoid valve is installed to by-pass the purge flow control 24. The program timer is adjusted so that the instant a dump valve 27 closes on a low pressure bed, the repressuring valve 19 opens. This allows pure product to fill that bed to the full line pressure. A throttling valve 31 allows the rate of repressuring to be adjusted as desired. After the bed has reached full line pressure, its feed valve 4 is opened. Simultaneously, the feed valve 5 to the spent bed is shut. Finally, both the dump valve to the spent bed opens 6 and the repressuring valve 19 shuts off. The spent bed dumps to the low pressure and its purge with pure product commences.

Also to derive the maximum benefit of the pure product used as purge, the purge flow is delayed until the spent bed has nearly reached its lowest pressure. The purge flow then begins. The purge is thus used at maximum expanded volume. This is accomplished by use of a spring loaded check valve (relief valve 20) ahead of the purge flow controller 22. In the tests to make pure $H_2$, the spring loaded check was set to blow by at 130 p.s.i. differential pressure. Full line feed pressure was 155 p.s.i.g. Thus, the purge flow was delayed until the pressure in the spent bed had blown down to 155−130=25 p.s.i.g. The operation was satisfactory.

As mentioned above, a surge tank was used in the pure $H_2$ product line markedly increased the $H_2$ recovery from the feed. Without the tank, $H_2$ recovery from a 50–50 $H_2$–$CH_4$ mixture was 59%. With it the recovery increased to 70%. Its volume was about five times the volume of one bed. Its main function was to spread the demand for recharge product $H_2$ over the full adsorption cycle. This reduced the feed space velocity through the on stream bed during the repressuring.

What is claimed is:

1. A process for the removal of a key component from a gaseous mixture stream utilizing two adsorbent beds each of which is characterized by having a one end and another end, said process comprising the steps of flowing a feed stream of a gaseous mixture including a key component from one end to the other end through a first bed of an adsorbent initially relatively free of said key component at a preselected initial relatively high pressure and in a positive flow direction in an initial cycle, said adsorbent being preferentially selective for said key component; discharging a gaseous stream from said first bed as a primary effluent; segregating a portion of said primary effluent as a product stream and withdrawing the same; passing the remainder of said primary effluent in reverse flow from the other end to the one end through a second bed of adsorbent at a realtively low pressure, which adsorbent is relatively saturated with said key component as compared to said first bed at the start of said initial cycle, whereby as said initial cycle continues, said first bed becomes relatively saturated with said key component progressively from said one end toward said other end, and whereby said second bed becomes relatively freed from said key component from said other end toward said one end; continuing said initial cycle for a time period less than that required to secure saturation of said first bed at said other end and that required to secure freedom from said key component of said second bed at said one end; then raising the pressure on said second bed to said high pressure by repressuring with a portion of said product stream introduced into said other end thereafter introducing said feed stream into said one end of said second bed in positive flow direction at said initial relatively high pressure; discharging a gaseous stream from said other end of said second bed as a primary effluent; segregating a portion of said last named primary effluent as a product stream and withdrawing the same; passing the remainder of said last named primary effluent in reverse flow from said other end to said one end through said first bed of adsorbent at said relatively low pressure, and thereafter cyclically continuing the operation wherein a portion of said primary effluent removed from said first bed is stored and thereafter utilized to assist in raising the pressure on said second bed to said high pressure.

2. A process for the removal of a key component from a gaseous mixture stream utilizing two adsorbent beds each of which is characterized by having a one end and another end, said process comprising the steps of flowing a feed stream of a gaseous mixture including a key component from one end to the other end through a first bed of an adsorbent initially relatively free of said key component at a preselected initial relatively high pressure and in a positive flow direction in an initial cycle, said adsorbent being preferentially selective for said key component; discharging a gaseous stream from said first bed as a primary effluent; segregating a portion of said primary effluent as a product stream and withdrawing the same; passing the remainder of said primary effluent in reverse flow from the other end to the one end through a second bed of adsorbent at a relatively low pressure, which adsorbent is relatively saturated with said key component as compared to said first bed at the start of said initial cycle, whereby as said initial cycle continues, said first bed becomes relatively saturated with said key component progressively from said one end toward said other end, and whereby said second bed becomes relatively freed from said key component from said other end toward said one end; continuing said initial cycle for a time period less than that required to secure saturation of said first bed at said other end and that required to secure freedom from said key component of said second bed at said one end; then raising the pressure on said second bed to said high pressure by repressuring with a portion of said product stream introduced into said other end thereafter introducing said feed stream into said one end of said second bed in positive flow direction at said initial relatively high pressure; discharging a gaseous stream from said other end of said second bed as a primary effluent; segregating a portion of said last-named primary effluent as a product stream and withdrawing the same; passing the remainder of said last named primary effluent in reverse flow from said other end to said one end through said first bed of adsorbent at said relatively low pressure, and thereafter cyclically continuing the operation wherein a portion of said primary effluent removed from said first bed is stored and thereafter utilized to assist in raising the pressure on said second bed to said high pressure and wherein the time of said cycles is of such short duration that the heats of adsorption and desorption are substantially balanced within said beds and that substantially the sole source of heat to and from said gaseous mixtures within said beds is said heats of adsorption and desorption, thereby eliminating the need for transfer of heat externally to said beds.

3. An apparatus for adsorptive fractionation of a gaseous mixture, said apparatus comprising in combination (1) two separately defined chamber vessels,
(2) said chamber vessels being adapted to contain a body of adsorbent material in each of said vessels, said bodies being preferentially adsorptive of at least one and the same component of said mixture,
(3) a first primary inlet conduit means for one of said vessels and a second primary inlet conduit means for the other of said vessels, said primary inlet conduit means being connected to each of said vessels wherethrough said gaseous mixture may be supplied to said vessels,
(4) inlet valve means in each of said primary inlet conduit means whereby the supply of said gaseous mixture to said vessels may be alternated from vessel to vessel,
(5) a first primary outlet conduit means for one of said vessels and a second primary outlet conduit means for the other of said vessels, one of said primary outlet conduit means being connected to each of said vessels wherethrough gaseous material may be removed from said vessels as a primary effluent product, both said primary outlet conduit means and both said primary inlet conduit means being so connected to said vessels to establish therebetween in each vessel a primary path of flow of gaseous material through each of said vessels adapted to contain bodies of adsorbent material,
(6) reflux conduit means to supply a product purge, connected to each of said vessels wherethrough at least a portion of said primary effluent product removed from either of said vessels may be directed into the other vessel, said reflux conduit means including a pressure responsive reflux valve means so constructed and arranged that product flow through said pressure responsive reflux valve means only occurs when the pressure within one of said vessels is at approximately the lowest point of the adsorption cycle,
(7) a first secondary outlet conduit means for one of said vessels and a second secondary outlet conduit means for the other of said vessels wherethrough gaseous material may be removed from said vessels as a secondary effluent product, said secondary outlet conduit means and said reflux conduit means being so connected to said vessels to establish therebetween in each vessel a secondary path of flow of gaseous material through each of said vessels adapted to contain bodies of adsorbent material which is substantially coincident with and opposite in direction to said primary path of flow therethrough,
(8) outlet valve means in each of said secondary outlet conduit means whereby the removal of said secondary effluent product from said vessels may be alternated from vessel to vessel,
(9) vessel repressuring conduit means communicating between said vessels including a repressuring valve means, said repressuring valve means being so constructed and arranged as to permit primary effluent product flow therethrough to a vessel when said outlet valve means and said inlet valve means of said vessel communicating with said repressuring valve means are closed, the pressure within said one of said vessels is initially at a lower pressure than said primary effluent product, the pressure within said vessel can be brought up to the pressure of said primary effluent product and the major proportion of primary product flow therethrough takes place when said pressure gradient across said pressure responsive reflux valve is insufficient to cause flow therethrough, and
(10) primary effluent storage means positioned in communication with said primary outlet conduit means and so constructed and arranged that when said repressuring valve means opens one of said vessels will be repressured mostly from said primary effluent storage means.

4. Apparatus as defined by claim 3 wherein said inlet valve means, said repressuring valve means and said outlet valve means are rsponsive to control by a program timer so constructed and arranged that said program timer functions to close said inlet and outlet valve means of a vessel and to simultaneously open said repressuring valve means, thereafter when said vessel attains a predetermined high pressure to open the inlet valve means to said vessel and to close inlet valve means and open outlet valve means of said secondary outlet conduit for said other vessel and to simultaneously close said repressuring valve means.

5. Apparatus as defined by claim 3 wherein said pressure responsive reflux valve means is a spring loaded check valve.

6. Apparatus as defined in claim 3 wherein said primary effluent storage means is a product surge tank.

References Cited in the file of this patent

UNITED STATES PATENTS

| 2,944,627 | Skarstrom | July 12, 1960 |
| 2,955,673 | Kennedy et al. | Oct. 11, 1960 |

OTHER REFERENCES

"Low Dew-Point Compressed Air," Compressed Air Magazine, September 1959, pages 11 to 13.